United States Patent
Pfizenmaier et al.

[11] Patent Number: 6,028,560
[45] Date of Patent: Feb. 22, 2000

[54] DEVICE FOR DIRECTIONAL TRANSMISSION AND/OR RECEIVING OF ELECTROMAGNETIC WAVES

[75] Inventors: Heinz Pfizenmaier, Leonberg; Joerg Schneemann, Weissach; Ulrich Mahr, Backnang, all of Germany

[73] Assignee: Robert Bosch GmbH, Stuttgart, Germany

[21] Appl. No.: 09/040,246

[22] Filed: Mar. 3, 1998

[30] Foreign Application Priority Data

Nov. 5, 1997 [DE] Germany ............... 197 10 811

[51] Int. Cl.[7] .................................. H01Q 19/06
[52] U.S. Cl. .................. 343/753; 343/909; 343/911 R
[58] Field of Search ............................ 343/753, 754, 343/909, 911 R; H01Q 19/06

[56] References Cited

U.S. PATENT DOCUMENTS

| | | | |
|---|---|---|---|
| 3,787,872 | 1/1974 | Kauffman | 343/754 |
| 4,794,398 | 12/1988 | Raber et al. | 343/754 |
| 5,264,859 | 11/1993 | Lee et al. | 343/753 |
| 5,680,139 | 10/1997 | Huguenin et al. | 343/753 |
| 5,745,082 | 4/1998 | Alder | 343/753 |

FOREIGN PATENT DOCUMENTS

| | | |
|---|---|---|
| 0 498 524 | 8/1992 | European Pat. Off. . |
| 93/10572 | 5/1993 | WIPO ............ H01Q 19/06 |
| WO 97/02496 | 1/1997 | WIPO . |

Primary Examiner—Don Wong
Assistant Examiner—Hoang Nguyen
Attorney, Agent, or Firm—Kenyon & Kenyon

[57] ABSTRACT

In a device for directional transmission and/or receiving of electromagnetic waves, including at least one antenna element and a dielectric lens, there is arranged between them a prefocusing dielectric body for avoiding overradiation of the lens. In order to simplify adjustment, the lens has an extended surface, is preferably pot-shaped, and forms, in conjunction with a baseplate, a hermetically sealed housing for unencapsulated ICs.

12 Claims, 1 Drawing Sheet

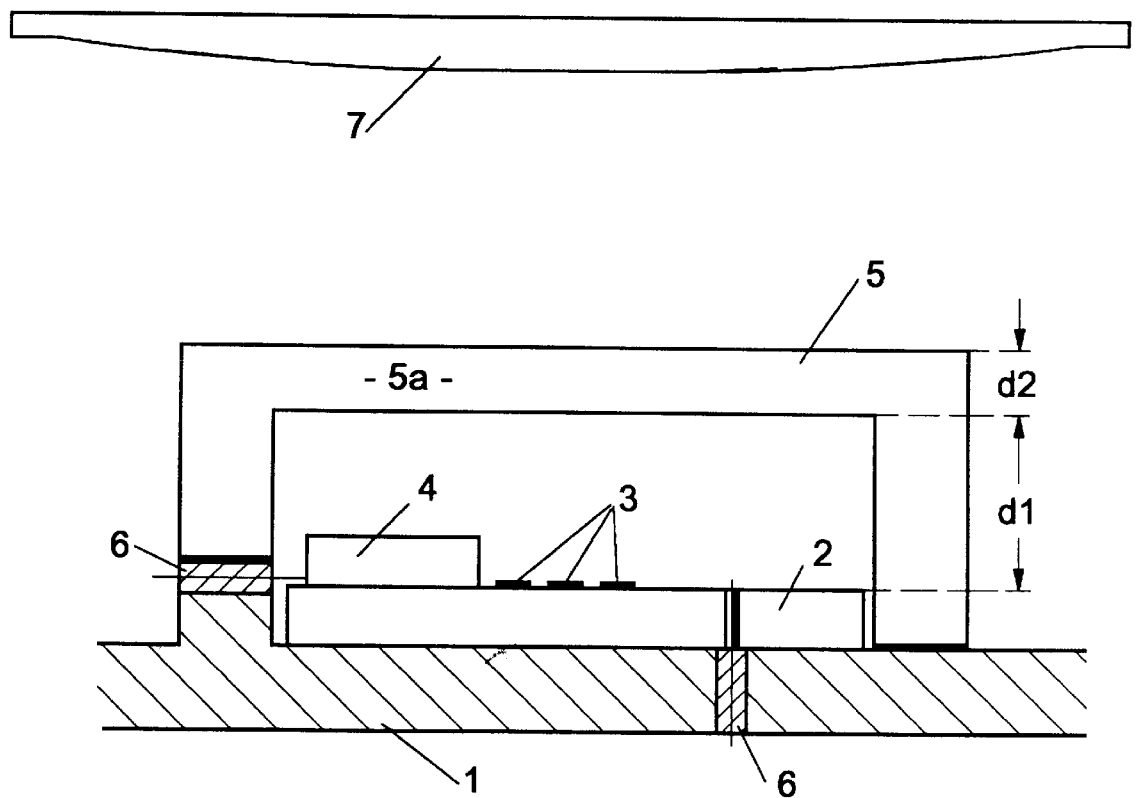

6,028,560

DEVICE FOR DIRECTIONAL TRANSMISSION AND/OR RECEIVING OF ELECTROMAGNETIC WAVES

FIELD OF THE INVENTION

The present invention relates to a device for directional transmission and/or receiving of electromagnetic waves, including at least one transmitting/receiving element and a dielectric lens. The at least one transmitting/receiving element, hereinafter referred to as the antenna element, is used for the excitation and/or actual receiving of electromagnetic waves. The dielectric lens is used for obtaining a directional effect or the desired antenna lobes. The device according to the present invention is used, for example, in a motor vehicle radar system for detecting vehicles traveling ahead.

BACKGROUND INFORMATION

A device including at least one antenna element and a dielectric lens is known, for example, from European Patent No. 498 524, in which a motor vehicle radar system for detecting vehicles traveling ahead is also described. This is a so-called bistatic radar sensor, i.e., a radar sensor with separate antennas for the send and receive paths. Independently of this peculiarity, each of the two antennas comprises a dielectric lens and at least one antenna element. In such a device, in particular in a transmitting antenna, the fact that the beam angle of the antenna element(s) is usually wider than the dielectric lens presents some difficulties. This means that part of the electromagnetic waves generated bypasses the dielectric lens. This portion is therefore not focused in the desired direction by the dielectric lens, which reduces the overall antenna yield.

In PCT International Publication No. WO 97/02496, a monostatic radar sensor is described, which is also provided for use in motor vehicles. Monostatic means that the same antenna is used for the transmission and receiving paths. In this case, it comprises at least three antenna elements and a dielectric lens arranged in front of these elements. In order to avoid overradiation of the lens when transmitting, a "polyrod" is arranged in front of each antenna element. This is understood as an approximately conical dielectric body, which, due to its dielectric properties, causes the electromagnetic waves generated to be prefocused. The exact adjustment of the individual polyrods presents difficulties, as even a very small deviation from the ideal position results in the lens being overradiated again.

SUMMARY OF THE INVENTION

An object of the present invention is therefore to provide a device in which the adjustment of a prefocusing dielectric body is substantially simplified. This object is achieved according to the present invention by using a extended-surface dielectric disk for prefocusing. This preferably forms the cover surface of a pot-shaped dielectric body, which surrounds the antenna element as a housing. The directional effect of the dielectric disk is based on the superstrate effect, which is described, for example, in the article "Hochbündelnde Antennen mit geringen Verlusten für Millimeterwellenanwendungen" (Highly Directional Low-Loss Antennas for Millimeter Wave Applications) by Helmut Ostner and Jürgen Detlefsen, published at the "ITG Conference, Antennas" of Apr. 12–15, 1994. Due to the extended surface of the dielectric disk, the often multiple side alignments of the dielectric body as required for polyrods are no longer needed.

According to an advantageous embodiment of the present invention, the pot-shaped dielectric body, together with the support material of the antenna elements, forms a hermetically sealed housing. This can be advantageously used for mounting MMICs (Monolithic Microwave Integrated Circuits), made in gallium arsenide in particular, in addition to the antenna elements. Such MMICs normally require hermetically sealed encapsulation due to their sensitivity to environmental influences, which is no longer required with this arrangement. Thus, the relatively expensive, separate sealing of the gallium arsenide MMICs can be omitted. Of course, other components requiring protection can also be accommodated in this housing.

BRIEF DESCRIPTION OF THE DRAWING

The FIGURE shows a cross-section of the device according to the present invention.

DETAILED DESCRIPTION

As shown in the Figure, on a base plate 1, which is made of metal in this exemplary embodiment, there is a circuit arrangement 2, preferably manufactured according to bus strip technology. This is made of a dielectric material, for example quartz or cordierite, and has metallic conductor structures on its top side. In addition to filter circuits and branching structures, there are in particular three antenna elements 3, configured in this embodiment as patch antennas. Above this circuit arrangement 2, hereinafter referred to as MIC (microwave integrated circuit), there is a dielectric body 5 with a U-shaped cross-section, forming a pot-shaped structure with the circuit arrangement. The dielectric body, together with baseplate 1, forms a housing around MIC 2. The cover surface 5a of dielectric body 5 is parallel to the surface of MIC 2 and has a thickness $d_2$, calculated according to the following formula:

$$d_2 = (2m - 1) \cdot \frac{\lambda_0}{4\sqrt{n_2^2 - \sin^2\Theta_p}}$$

where $d_2$ is the aforementioned thickness, m is an arbitrary natural number, m=1, 2, 3, . . . , $\lambda_0$ is the free-space wavelength of the transmitted/received wave, $n_2$ is the refraction coefficient of the cover surface material of the dielectric body, and $\Theta_p$ is the desired beam direction of the wave measured in degrees to the normal to the cover surface.

The distance between cover surface 5a of the dielectric body and the surface of MIC 2 is denoted as $d_1$ and is calculated according to the following formula:

$$d_1 = m \cdot \frac{\lambda_0}{2\sqrt{n_1^2 - \sin^2\Theta_p}}$$

where $d_1$ is the aforementioned thickness, m is an arbitrary natural number, m=1, 2, 3, . . . , $\lambda_0$ is the free-space wavelength of the transmitted/received wave, $n_1$ is the refraction coefficient of the cover surface material of the dielectric body, and $\Theta_p$ is the desired beam direction of the wave measured in degrees to the normal to the cover surface.

An antenna lens 7 is located above cover surface 5a of dielectric body 5. In addition, an MMIC 4 is shown within the area enclosed by dielectric body 5. On the left side wall of dielectric body 5 and on baseplate 1, hermetically sealed electric feed-throughs 6 are indicated.

Additional components of the high-frequency part of the overall radar system are integrated in MIC 2 and MMIC 4. The electromagnetic waves generated by these components are radiated out via patch antennas 3 and initially propagate in the space enclosed by dielectric body 5. According to the physical boundary conditions of Maxwell's equations, they can enter dielectric body 5, but can only fully penetrate it at certain angles. By suitably selecting cover surface thickness $d_2$, distance $d_1$, and the dielectric constant of the cover surface material, the desired prefocusing onto lens 7 is achieved. Thus, for example, for a transmission frequency of 75 GHz, desired direction of radiation $\Theta_p=0°$, a refraction index $n_1=1$ (air), and a refraction index $n_2$=square root (10) ($Al_2O_3$ ceramic material):

$d_1$=2 mm $d_2$=0.316 mm

The refraction index of a material, as known, is equal to the square root of the respective dielectric constant. The greater the ratio $n_2/n_1$, the better the resulting prefocusing. Suitable materials for the dielectric body include, in particular, all materials with high dielectric constants, such as, for example, $Al_2O_3$ ceramic material, $CaZrO_3$ ceramic material, barium polytitanate, or $MgCaTiO_2$.

In addition, the lateral dimension of cover surface 5a of the dielectric body must be sufficiently great to cover the effective surface of all antenna elements. This condition is approximately met if the dimension in both lateral directions is at least five times the free space wavelength $\lambda_0$. In view of its electrical properties, the dielectric body is preferably round on the sides. However, other surface shapes, for example, rectangular shapes, may be preferred for design reasons.

The housing including baseplate 1 and dielectric body 5 is preferably hermetically sealed, i.e., the components arranged therein are sealed from the outside environment in a gas-tight manner. This advantageously allows MMIC 4 to be designed without separate encapsulation, which would otherwise be essential. Feed-throughs 6 may be implemented by gluing or soldering metal rods into dielectric body 5 and/or baseplate 1 and MIC substrate 2. Commercially available metallic "viaholes" can possibly be inserted into the dielectric body and/or the MIC substrate.

Hermetic sealing of the housing thus formed is, as mentioned before, necessary especially if gallium arsenide components are to be mounted without encapsulation, since at this time this material, in contrast with silicon, cannot be sufficiently protected by an oxide layer. Insufficient protection would, however, permanently destroy the doping profile of the components.

Accurate adjustment of prefocusing is reduced in this case to the most accurate possible manufacture of the pot-shaped dielectric body 5. Assembly itself is performed by gluing or soldering the body to baseplate 1.

According to the aforementioned article by Ostner and Detlefsen, cover surface 5a of the dielectric body, in particular, can also be made of different layered dielectric materials. In addition, the side walls of dielectric body 5 can be made oblique to cover surface 5a for design reasons, for example. Other modifications of the embodiment outlined herein may include side walls that are oblique to cover surface 5a for design reasons, for example. Also the embodiment is not limited to antenna elements and the respective circuit being manufactured according to bus strip technology. Thus, any other embodiments, such as for example $\lambda/2$ dipoles or horn antennas, may also be used. In particular, due to the $\sin^2\Theta_p$ term in the above formulas, an oblique arrangement of lens 7 in front of dielectric body 5 is possible.

The embodiment described herein refers in this case to a three-beam radar system, i.e., a radar system with three separate antenna lobes. The prefocusing shown herein can, however, be used in other transmission and/or receiving devices, such as, for example, a single-beam radar system or directional radio systems.

What is claimed is:

1. A device for at least one of directionally transmitting and receiving electromagnetic waves, comprising:
    at least one transmitting/receiving element;
    a dielectric lens; and
    at least one additional dielectric body including side walls and a top wall arranged between the at least one transmitting/receiving element and the dielectric lens, the top wall of the at least one additional dielectric body extending over the at least one transmitting/receiving element.

2. The device according to claim 1, wherein the at least one additional dielectric body encapsulates unencapsulated ICs located in a vicinity of the at least one transmitting/receiving element.

3. The device according to claim 2, wherein the ICs include monolithic microwave integrated circuits made on gallium arsenide, and wherein the at least one additional dielectric body hermetically seals the monolithic microwave integrated circuits.

4. The device according to claim 1, wherein the cover surface of the at least one additional dielectric body is located in a beam path of the electromagnetic waves, and the cover surface is at least five times as large as a free-space wavelength.

5. The device according to claim 1, wherein at least one wall of the walls of the at least one additional dielectric body is made of a ceramic material.

6. The device according to claim 1, wherein the cover surface of the at least one additional dielectric body is constructed of different layered dielectric materials.

7. The device according to claim 1, wherein the at least one transmitting/receiving element is aligned in a perpendicular manner with respect to at least one wall of the walls.

8. A device for at least one of directionally transmitting and receiving electromagnetic waves comprising:
    at least one transmitting/receiving element;
    a dielectric lens; and
    at least one additional dielectric body arranged between the at least one transmitting/receiving element and the dielectric lens, a surface of the at least one additional dielectric body extending over the at least one transmitting/receiving element, a cover surface of the at least one additional dielectric body having a thickness $d_2$, the thickness $d_2$ being consistent with the following equation:

$$d_2 = (2m - 1) \cdot \frac{\lambda_0}{4\sqrt{n_2^2 - \sin^2\Theta_p}}$$

wherein m is an arbitrary natural number, m=1, 2, 3, ..., $\lambda_0$ is a free-space wavelength of the electromagnetic waves, $n_2$ is a refraction coefficient of a cover surface material of the at least one additional dielectric body, and $\Theta_p$ is a desired beam direction of the electromagnetic waves measured in degrees to a normal to the cover surface.

9. A device for at least one of directionally transmitting and receiving electromagnetic waves, comprising:
- at least one transmitting/receiving element;
- a dielectric lens; and
- at least one additional dielectric body arranged between the at least one transmitting/receiving element and the dielectric lens, a surface of the at least one additional dielectric body extending over the at least one transmitting/receiving element, a distance $d_1$ between the at least one additional dielectric body and a plane in which the at least one transmitting/receiving element is located being consistent with the following equation:

$$d_1 = m \cdot \frac{\lambda_0}{2\sqrt{n_1^2 - \sin^2\Theta_p}}$$

wherein m is an arbitrary natural number, m=1, 2, 3, ..., $\lambda_0$ is a free-space wavelength of the electromagnetic waves, $n_1$ is a refraction coefficient of a cover surface material of the at least one additional dielectric body, and $\Theta_p$ is a desired beam direction of the electromagnetic waves measured in degrees to a normal to the cover surface.

10. A device for at least one of directionally transmitting and receiving electromagnetic waves, comprising:
- at least one transmitting/receiving element;
- a dielectric lens; and
- at least one additional dielectric body arranged between the at least one transmitting/receiving element and the dielectric lens, a surface of the at least one additional dielectric body extending over the at least one transmitting/receiving element, at least one of the at least one additional dielectric body and a support material, which is connected to the at least one additional dielectric body, having hermetically sealed electric feed-throughs.

11. A device for at least one of directionally transmitting and receiving electromagnetic waves, comprising:
- at least one transmitting/receiving element;
- a dielectric lens; and
- at least one additional dielectric body arranged between the at least one transmitting/receiving element and the dielectric lens, a surface of the at least one additional dielectric body extending over the at least one transmitting/receiving element, the surface being situated at a predetermined distance from the dielectric lens the at least one additional dielectric body forming a cavity within which the at least one transmitting/receiving element is situated, the dielectric lens being situated outside of the cavity.

12. A device for at least one of directionally transmitting and receiving electromagnetic waves, comprising:
- at least one transmitting/receiving element;
- a dielectric lens; and
- at least one additional dielectric body arranged between the at least one transmitting/receiving element and the dielectric lens, at least one side wall of the at least one additional dielectric body having a first end coupled to a base portion, the at least one side wall extending from the first end toward the dielectric lens to a second end of the at least one side wall, the at least one side wall further including a cover extending from the second end in a direction substantially parallel to the dielectric lens.

* * * * *